United States Patent [19]

Yamazaki et al.

[11] Patent Number: 5,179,635
[45] Date of Patent: Jan. 12, 1993

[54] IMAGE MEMORY CONTROLLER

[75] Inventors: Hideki Yamazaki, Hitachi; Hiroshi Takeda, Higashi-yamamato; Yoshikazu Yokota, Kodaira, all of Japan

[73] Assignee: Hitachi, Ltd., Tokyo, Japan

[21] Appl. No.: 713,757

[22] Filed: Jun. 11, 1991

Related U.S. Application Data

[63] Continuation of Ser. No. 494,874, Mar. 8, 1990, Pat. No. 5,067,097, which is a continuation of Ser. No. 173,355, Mar. 25, 1988, abandoned.

[30] Foreign Application Priority Data

Mar. 27, 1987 [JP] Japan ................................ 62-71441

[51] Int. Cl.$^5$ ............................................. G06F 15/40
[52] U.S. Cl. ................................... 395/109; 395/101; 395/115; 364/DIG. 1; 364/262.9; 364/263.3
[58] Field of Search .............. 364/518, 521, 522, 519, 364/262.9, 263.3, 946.9; 340/747, 750; 400/63, 83; 395/115, 109, 101

[56] References Cited

U.S. PATENT DOCUMENTS

| | | | |
|---|---|---|---|
| 4,470,129 | 9/1984 | Disbrow et al. | 364/900 |
| 4,646,259 | 2/1987 | Lincoln et al. | 364/900 |
| 4,712,185 | 12/1987 | Aoki | 364/518 |
| 4,712,929 | 12/1987 | Kitaoka | 400/76 |
| 4,736,330 | 4/1988 | Capowski | 364/518 |
| 4,742,344 | 5/1988 | Nakagawa et al. | 340/723 |
| 4,763,241 | 8/1988 | Egawa et al. | 346/154 |
| 4,774,528 | 9/1988 | Kato | 346/76 PH |

OTHER PUBLICATIONS

"LSI Handbook", Pub. by Ohm-sha, Nov. 30, 1984, pp. 554–556.

Primary Examiner—Gary V. Harkcom
Assistant Examiner—Phu K. Nguyen
Attorney, Agent, or Firm—Fay, Sharpe, Beall, Fagan, Minnich & McKee

[57] ABSTRACT

An image memory controller having a first address signal generation means for generating a first address signal in response to a state signal representing the operational state of a printer. The first address signal corresponds to a location in an image memory. A second address signal generation means generates a second address signal for refreshing the image memory and a third address signal generation means generates a third address signal used for rewriting at least part of data stored in the image memory. An address signal selection means selectively delivers any of the first, second, and third address signals to the image memory.

5 Claims, 6 Drawing Sheets

FIG. 4

| BEFORE INPUT OF THE SIGNAL PRREQ | THE OPERATION WHEN THE SIGNAL PRREQ OCCURS FOR THE FIRST TIME | | | THE OPERATION WHEN THE SIGNAL PRREQ OCCURS WITHOUT THE FIRST TIME | | |
|---|---|---|---|---|---|---|
| | HCFF | VCFF | | HCFF | VCFF | |
| AFTER INPUT OF THE PAGE CHANGING SIGNAL CP | 0 | 0 | SA → OUTPUT BUFFER ↘ TSA, TA | 1 | 1 | TA+PAI → OUTPUT BUFFER ↘ TA |
| AFTER INPUT OF THE LINE CHANGING SIGNAL CR | 0 | 1 | TSA+MW → OUTPUT BUFFER ↘ TSA, TA | 1 | 1 | TA+PAI → OUTPUT BUFFER ↘ TA |

FIG. 5

| SA | SA+PAI | SA+2PAI | | SA+mPAI |
|---|---|---|---|---|
| SA+MW | SA+MW+PAI | ------- | | |
| SA+2MW | ------- | | | |
| | | | | |
| | | | | |
| | | | | |
| | | | | |
| | | | | |
| | | | | |
| SA+nMW | SA+nMW+PAI | ------- | | SA+nMW+mPAI |

IMAGE MEMORY CONTROLLER

This application is a continuation of co-pending U.S. application Ser. No. 494,874, filed Mar. 8, 1990, now U.S. Pat. No. 5,067,097, which application is in turn a file-wrapper continuation of U.S. application Ser. No. 173,355, filed Mar. 25, 1988, now abandoned.

BACKGROUND OF THE INVENTION

This invention relates generally to image formation control technique and further to an image formation data controller for controlling access to a frame buffer memory used for image formation data storage in a hard copy image producing device. For instance, the present invention relates to the technique which will be effective when applied to an apparatus which supports image formation data output address operation control, drawing address control and refresh address control for a frame buffer memory which contains the image formation data for a laser printer.

CRTC (Cathode Ray Tube Controller) and ACRTC (Advanced Cathode Ray Tube Controller) have been used conventionally as a controller for making display and drawing address control for a frame buffer memory. These controllers fundamentally perform display control functions by utilizing various paramete..rs such as the timing of horizontal and vertical sync signals, the number of characters or pixels per row, the number of rasters, and so forth. They supply display data to a CRT display in accordance with these parameters while at the same time, they change the content of a display surface and refresh a dynamic frame buffer memory during a nondisplay period such as a horizontal trace line period, as described, for example, in "LSI Handbook", published by Ohm-sha, Nov. 30, 1984, pp. 554–556.

The inventors of the present invention examined the possibility of applying the display controller of the kind described above to the control of a hard copy apparatus such as a laser printer for forming an image by a system analogous to raster scanning in a CRT display apparatus. The present invention describes a display controller which supports a print data output address operation control for a frame buffer memory, a drawing control of print data for the frame buffer memory and a refresh address control for the frame buffer memory.

In the hard copy apparatuses such as the laser printer, necessary print data must be supplied in coordination with the state of a mechanical system which drives an optical system and a photosensitive drum as well as supplying paper. In the hard copy apparatuses such as the laser printer, however, the timing signals of a machine system change frequently at a row, or line on paper change during a normal print operation or at the occurrence of trouble such as the shortage of paper or ink. Under such circumstances, a display controller utilizes horizontal and vertical sync signals for system synchronization require a timing adjustment circuit to resynchronize the print data output address control with the state of the machine system of the hard copy apparatus. This resynchronization further complicates the refresh operation and the circuit construction of the apparatus.

In the prior art, the refresh address control by the display controller executes in a relatively short period in during non-display period such as the horizontal retrace line period while being synchronized with the horizontal and vertical sync signals. However, in a hard copy apparatus such as the laser printer, the image nonformation period is not constant because the apparatus involves the operation of a machine system which is not coordinated with a request for the image formation data. This necessitates the addition of a timing adjustment circuit function for the memory refresh operation. This circuit is exclusively used for coordinating the print data output address control with the state of the machine system of the hard copy apparatus to perform the memory refresh operation in the shortest necessary interval. It has thus been extremely difficult to synchronize the output timing control of the print data output address with the drawing address output and the refresh address output.

SUMMARY OF THE INVENTION

To solve the problems in the prior art technique described above the present invention consists of an image formation data controller which efficiently interfaces the print data output address operation control of the hard copy apparatus.

Another object of the present invention provides an image formation data controller which controls the refresh timing of a frame buffer memory in a predetermined interval synchronized with the print data output address operation control of the hard copy apparatus.

These and other objects and novel features of the present invention will become more apparent from the following detailed description when taken in conjunction with the accompanying drawings.

Among the embodiments of the invention described herein, the following will briefly illustrate a typical example.

Image formation data output address operation control for the frame buffer memory is performed with an image formation data output request signal, a pagechanging signal and a linear row-changing signal received from the hard copy apparatus. Image data address control is initialized to the start of a single page by the pagechanging signal; to the next line or row of the page by the line-changing signal; and, to the next address in a sequential scheme by the image formation data output request signal.

Additionally, there is a refresh address generation circuit which includes an adjustment means for controlling the refresh address output for the frame buffer memory. When the output request of the image formation data is activated prior to the end of a predetermined refresh interval the output request is processed at a higher priority than the refresh operation.

According to the first embodiment described above, address control for the image formation data output can be synchronized with the state changes in the hard copy apparatus. This synchronization is accomplished with a small scale circuit which monitors the state of the hard copy apparatus. The small scale circuit eliminates the need for an exclusive timing adjustment circuit for coordinating the image data output with the state change of the hard copy apparatus.

According to the second embodiment described above, the refresh timing interval is determined in conjunction with the timing of the output request of the image formation data. This consideration coordinates the print data output address operation control with the hard copy apparatus.

BRIEF DESCRIPTION OF THE DRAWINGS

FIG. 4 is an explanatory view showing an example of the operation sequence of the print address output;

FIG. 5 is an explanatory view showing the content of the print output address data that are outputted sequentially;

DESCRIPTION OF THE PREFERRED EMBODIMENTS

Figure 1:
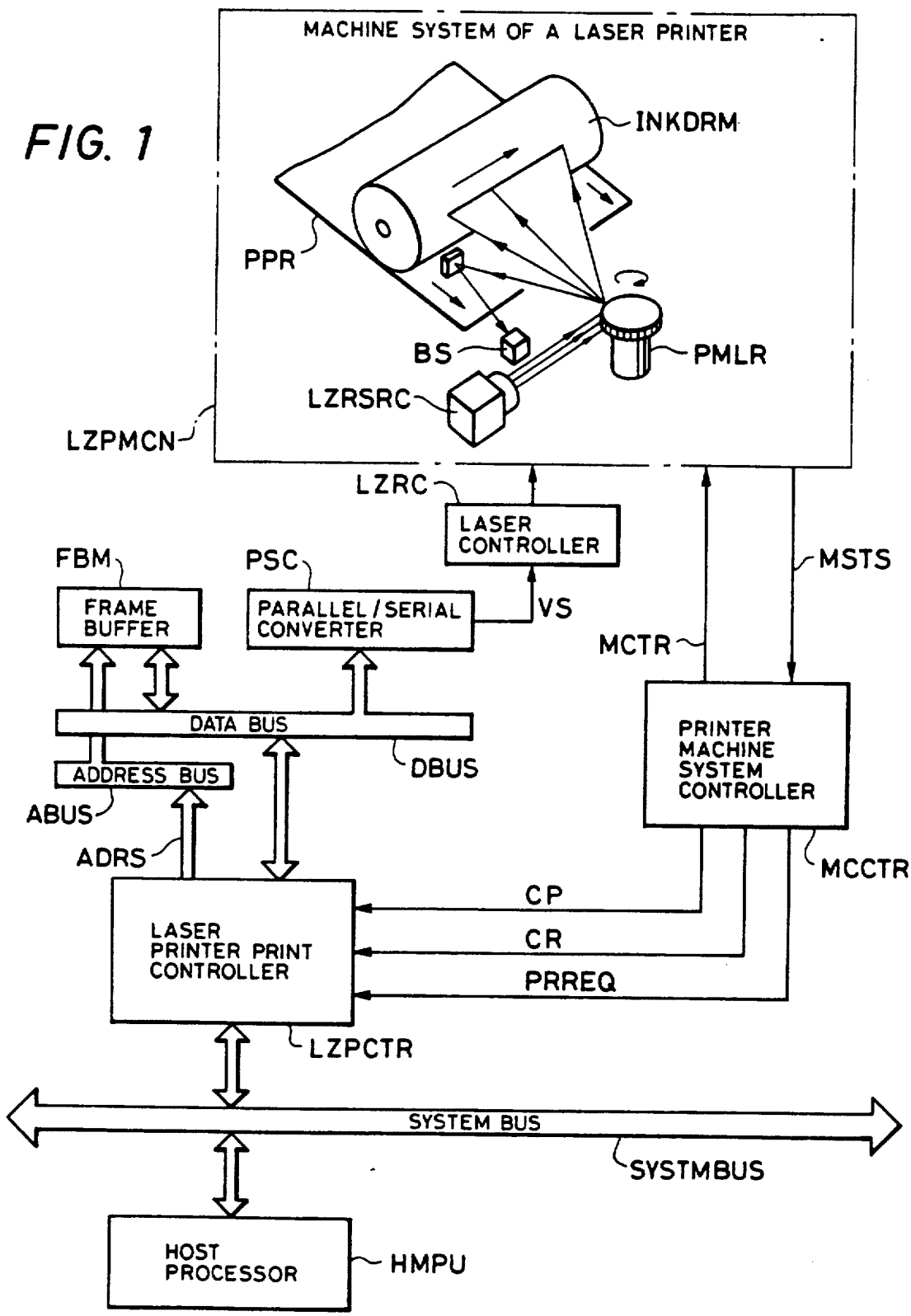
FIG. 1 is a block diagram of the first embodiment of the present invention wherein an image forming data controller of the invention is applied to a laser printer system.

FIG. 1 is a block diagram showing one embodiment of the present invention wherein the image forming data controller of the invention is applied to a laser printer system.

In FIG. 1, symbol LZPMCN represents the machine system of a laser printer, which includes an optical system for directing the output of a laser source LZRSRC, such as one containing a laser diode, to radiate a photosensitive drum INKDRM through a rotary polyhedral mirror PMLR. Radiation of the photosensitive drum with the laser beam occurs substantially in a horizontal plane. The optical system is analogous to so-called luster scanning which also uses a revolving photosensitive drum INKDRM. An electrostatic latent image is formed in the radiant portion of the laser beam, though this is not particularly limitative, and the latent image is then developed through a developing machine not shown. Ink or the like constituting the image thus developed is transferred to paper PPR producing a hard copy.

In FIG. 1, symbol FBM represents a frame buffer memory consisting of DRAM (Dynamic Random Access Memory) which stores rewritable print data in a so-called "bit map" system. The print data read from the frame buffer memory FBM is transferred by a data bus DBUS to a parallel/serial converter PSC which converts the data to a video signal VS and supplies the data to a laser controller LZRC. This video signal VS is used to produce the pattern to be printed. The laser controller LZRC modulates the laser beam by enabling and the laser source LZRSC output in synchronization with the video signal VS. The laser resulting beam is subjected to image formation on the photosensitive drum INKDRM through the rotary polyhedral mirror PMLR.

Drive control of the machine system of the laser printer LZPMCN described above is made by a printer machine system controller MCCTR. This printer machine system controller MCCTR supplies various machine system control signals MCTR to the laser printer machine system LZPMCN while machine system state signals MSTS representing a control operation state are supplied from the laser printer machine system LZPMCN. The printer machine system controller MCCTR outputs a page-changing signal CP, a line-changing signal CR and a print address output request signal PRREQ depending upon the machine system state signals MSTS. Each of these signals indicates an operation state of the laser printer machine system LZPMCN. Though not particularly limitative, the page-changing signal CP is generated by the paper feed trigger signal produced by the formation timing of the latent image on the photosensitive drum INKDRM. The line-changing signal is generated by a beam sensor BS which detects the laser beam shifting to a line, though not particularly limitative. The print address output request signal PRREQ is activated when each portion of the laser printer machine system LZPMCN is ready for forming the image upon radiation of the laser beam, though this arrangement is not particularly limitative.

In FIG. 1, symbol LZPCTR represents a laser printer print controller as an image-forming data controller in accordance with the present invention. It is a peripheral controller which supports print data output address operation control for the frame buffer memory FBM, drawing control of print data for the frame buffer memory FBM and refresh address control for the frame buffer memory FBM. The laser printer print controller LZPCTR is formed on one semiconductor chip by a known semiconductor circuit fabrication technique.

The control operation timing of the laser printer print controller LZPCTR is synchronized with the operation state of the laser printer machine system LZPMCN indicated by the page-changing signal CP, the line-changing signal CR and the print address output request signal PRREQ described above. The laser printer print controller LZPCTR is also connected to a system bus SYSTMBUS through which the host processor HMPU can control the LZPCTR.

Figure 2:
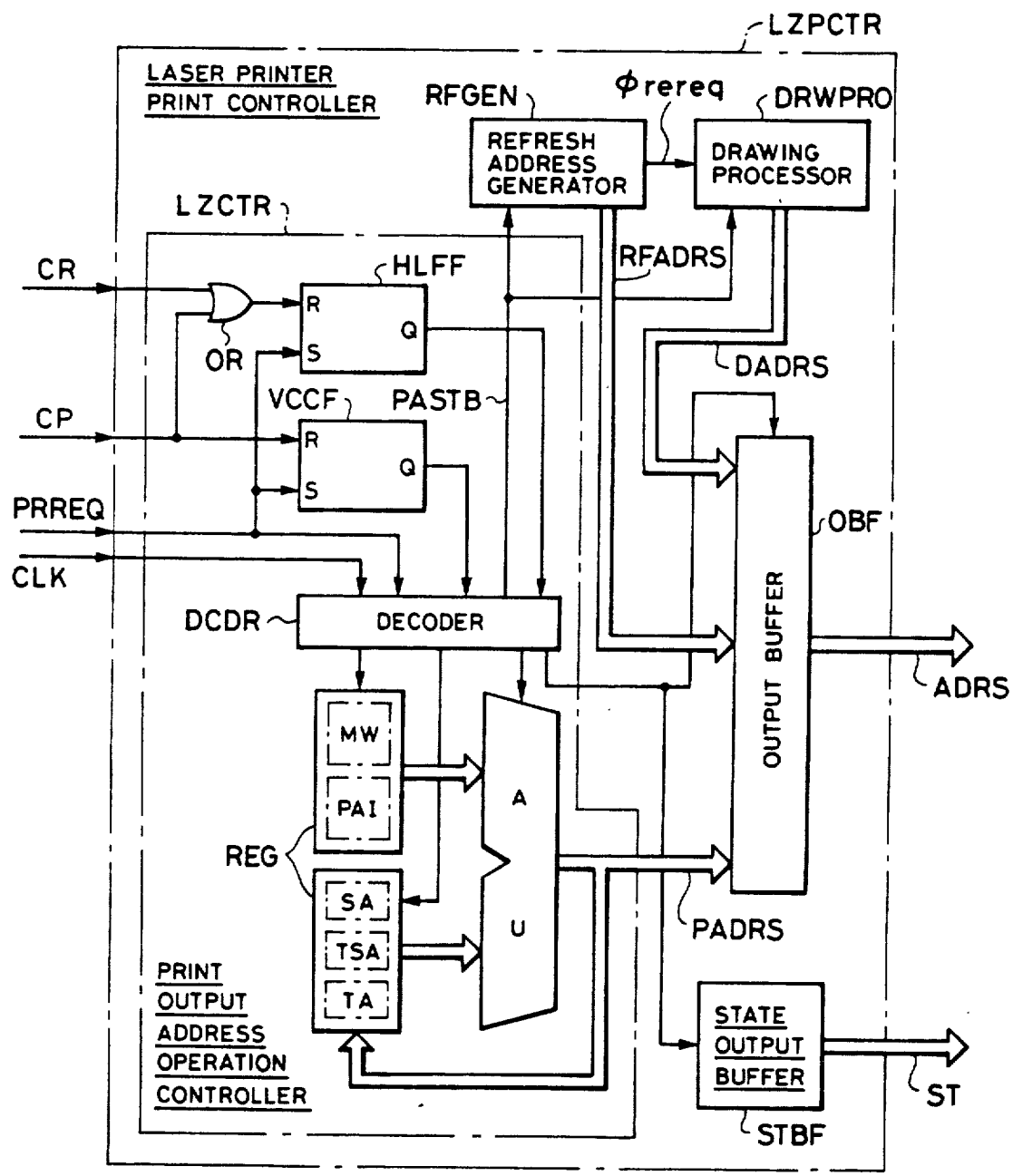
FIG. 2 is a block diagram showing one example of the laser printer print controller shown in FIG. 1.

FIG. 2 is a block diagram showing an example of the laser printer print controller LZPCTR. FIG. 2 particularly details an address signal qeneration system. This laser printer print controller LZPCTR can be functionally divided into a print output address operation controller LZCTR for controlling the output address operation control of print data from the frame buffer memory FBM, a drawing processor DRWPRO for controlling the drawing of the print data and a refresh address generator RFGEN for controlling the refresh address in the frame buffer memory FBM. The print output address PADRS from the print output address operation controller LZCTR, the drawing address DADRS from the drawing processor DRWPRO and the refresh address RFADRS from the refresh address generator RFGEN are supplied to the frame buffer memory FBM from the output buffer OBF through the address bus ABUS. These signals are denoted ADRS in FIGS. 1 and 2. The address operation function is controlled by a state designation signal representing the operation state of the printer. One of the state designation signals is an output request signal requiring the continuous output of a series of image data. The access control means which makes access control to the memory executes address operation for sequentially generating corresponding address signals on the basis of the output request signal.

The access control means has a drawing address formation function for generating a drawing address signal used for rewriting at least part of the data stored in the memory.

Figure 3:
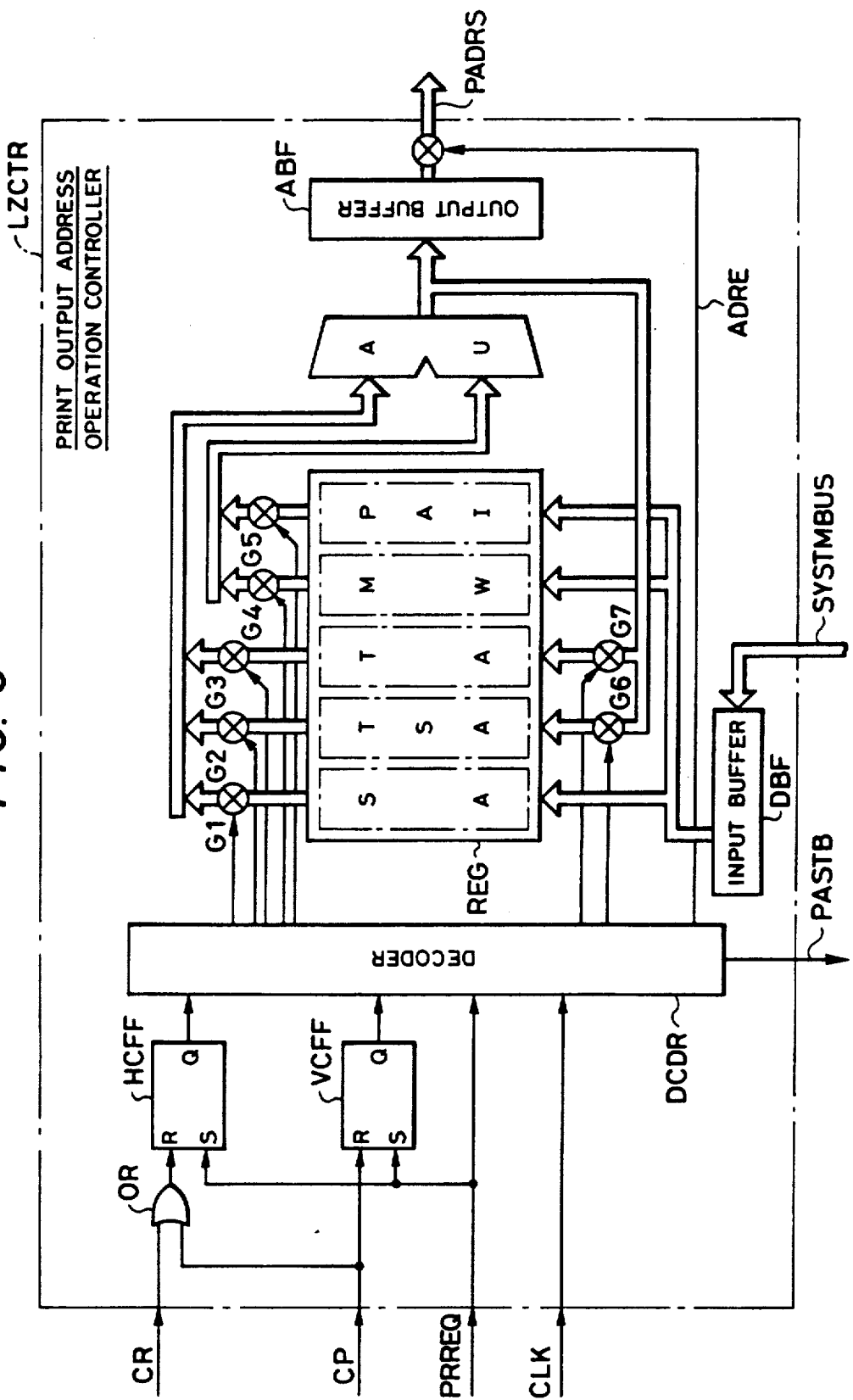
FIG. 3 is a block diagram showing an example of the operation sequence of a print address output operation controller shown in FIG. 2.

FIG. 3 is a block diagram detailing the print output address operation controller LZCTR described above. The print output address operation controller LZCTR has an address operation register array REG. This register array REG consists of a start address register SA which stores the address corresponding to the start of a page, a memory width register MW which stores an address number of each line in the frame buffer memory FBM, a print address increment register PAI which stores an address increment per memory cycle, a temporary start address register TSA which stores the leading address of each line and a current address register TA which stores a current address. The start address register SA, the memory width register MW and the print address increment register PAI are initiated by the host processor HMPU through an input buffer DBF. The contents of the temporary start address register TSA and current address register TA are written and updated during the operation of the print output address control.

The output terminals of the start address register SA, temporary start address register TSA and current address register TA are connected to one of the input terminals of an arithmetic unit AU through gates G1 to G3, while the output terminals of the memory width register MW and print address increment register PAI are connected to the other input terminal of the arithmetic unit AU through gates G4 and G5. The output terminal of the arithmetic unit AU is connected to the input terminal of the output buffer OBF described above and to the input terminals of the temporary start address register TSA and current address register TA through gates G6 and G7.

Each of these gates G1 to G7 is controlled by an open/close selection signal from a decoder DCDR. The output signals of two RS type flip-flops, HCFF and VCFF, for horizontal and vertical control, respectively, the print address output request signal PRREQ described above and a clock signal CLK are supplied to the decoder DCDR. An inclusive-or signal of the page-changing signal CP and the line-changing signal CR is supplied to the reset terminal R of the horizontal control flip-flop HCFF while the pagechanging signal CP is supplied to the reset terminal R of the vertical control flip-flop VCFF. The print address output request signal PRREQ is supplied to the set terminal S of each of the horizontal and vertical control flip-flops HCFF and VCFF.

The high level of the line-changing signal CR, pagechanging signal CP and print address output request signal PRREQ is the active level, though this is not particularly limitative. The line-changing signal CR and the page-changing signal CP are set prior to the print address output request signal PRREQ being set to the active level (the print address output request designation level). In this embodiment, when a change of line or page occurs the line-changing signal CR and the pagechanging signal CP are set to the active level in response to the laser printer machine system LZPMCN state. After the state change for the new line or page is accomplished in the laser printer machine system LZPMCN, the print address output request signal PRREQ is set to the active level.

With regard to the bus provided between the data bus and the laser printer print controller, the laser printer print controller transmits the drawing data to the frame buffer via this bus in order to write the drawing data into the frame buffer. Furthermore, the laser printer print controller reads the drawing data stored in the frame buffer via the bus. As can be seen from FIG. 2, this figure does not show the bus and means for providing the drawing data to the bus and for receiving the drawing data stored in the frame buffer.

The state output buffer (STBF) generates the status signal (ST) in response to the output of the decoder (DCDR). This status signal (ST) indicates the present status of the address signals (ADRS). For example, the signal (ST) indicates the kind of the address signals which are outputted as the address signals (ADRS) from the output buffer (OBF).

The output buffer (OBF) in FIG. 2 is different from the output buffer (ABF) in FIG. 3. Since the bus provided between the output buffer (OBF) and the print output address operation controller is relatively long, the output buffer (ABF) is provided as the driver in the print output address operation controller.

The operation control sequence of the line-changing signal CR, the page-changing signal CP, the print address output request signal PRREQ and the print output address synchronized with the clock signal CLK is shown in FIG. 4. The sequence is represented by the two systems, i.e., after-the-active-state of the page-changing signal CP and after-the-active-state of the line-changing signal, as shown in FIG. 4, the print output addresses shown in FIG. 5 are generated sequentially. The sequence begins when the page-changing signal CP is set to the active level and the horizontal and vertical control flip-flops HCFF and VCFF are reset. Upon the print address output request signal PRREQ going to the active level gate 1 is enabled for one memory cycle of the frame buffer memory FBM. The start address of the page stored in the start address register SA is output through the arithmetic unit AU to the output buffer ABF which is a non-operative state. Similarly, the page start address is supplied as the print output address signal PADRS to the frame buffer memory FBM when the address output enable signal ADRE goes to an active level. At this time, the page start address outputted through the arithmetic unit AU is stored in the temporary register TSA and in the current address register TA through the gates G6 and G7. Each operation sequence in such a memory cycle is executed in synchronization with the cycle of the clock signal CLK.

When the horizontal and vertical control flip-flops HCFF and VCFF are kept under the set state in the subsequent memory cycle, that is, when the horizontal control flip-flop HCFF and/or the vertical control flip-flop VCFF are not reset prior to the change of the line-changing signal CR or the pagechanging signal CP to the active level, the stored data of the current address register TA and the stored data of the print address increment register PAI are added together in the arithmetic unit AU for each memory cycle and the sum is stored in the output buffer ABF. The computed address is supplied as the print output address signal PADRS to the frame buffer memory FBM when the address output enable signal ADRE goes to the active level. At essentially the same time, the computed address is outputted through the arithmetic unit AU and stored in the current address register TA. The operation sequence in such a memory cycle is synchronized with the clock signal CLK in the same way as described above. Therefore, the print output address for the first line of the frame buffer memory FBM after the page change is sequentially SA, SA+PAI, SA+2PAI, SA+3PAI, ... , as shown in FIG. 5.

Next, the line-changing signal CR is set to the active level and only the horizontal control flip-flop HCFF is reset. Subsequently, when the print address output request signal PRREQ is set to the active level, the start address of the page stored in the temporary start address register TSA and the stored data in the memory width register MW are added by the arithmetic unit AU during one memory cycle of the frame buffer memory FBM, and the resultant sum (the start address of the second line) is stored in the output buffer ABF. At essentially the same time, the resultant address is supplied as the print output address signal PADRS to the frame buffer memory FBM in response to the change of the address output enable signal ADRE to the active level. In this case, the addition result address outputted from the arithmetic unit AU is stored in the temporary register TSA and in the current address register TA through the gates G6 and G7 that have been enabled. The operation sequence in such a memory cycle is synchronized with the clock signal CLK in the same way as described above.

When the horizontal and vertical control flip-flops HCFF and VCFF are kept under the set state in the subsequent memory cycle, that is, when the horizontal control flip-flop HCFF and/or the vertical control flipflop VCFF are not reset prior to the change of the linechanging signal CR or the page-changing signal CP to the active level, the stored data of the temporary address register TA and the stored data of the print address increment register PAI are added by the arithmetic unit AU during each memory cycle and the sum is stored in the output buffer ABF. At essentially the same time, the calculated address data is supplied as the print output address signal PADRS to the frame buffer memory FBM when the address output enable signal ADRE changes to the active level. In this case, the address data outputted from the arithmetic unit AU is stored in the current address register TA. The operation sequence in such a memory cycle is synchronized with the cycle of the clock signal CLK in the same way as described above.

Therefore, the print output address for the second line of the frame buffer memory FBM after the page change becomes sequentially SA+MW, SA+MW+PAI, SA+MW+2PAI, SA+MW+3PAI, ... , as shown in FIG. 5. The print output address is calculated for each of the subsequent lines.

Figure 6:
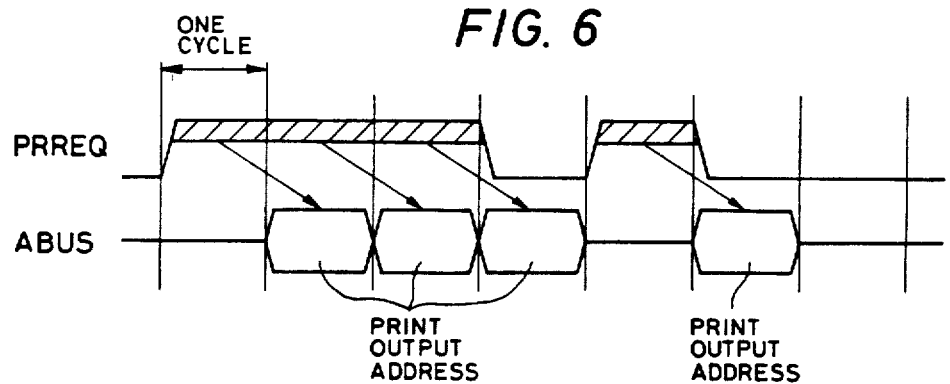
FIG. 6 is an explanatory view showing the output timing of the print address data in the print output address operation controller.

FIG. 6 shows the timing of the print output address in the print output address operation controller LZCTR. In this drawing, the output of this address is delayed by one memory cycle with respect to the change of the print address output request signal PRREQ to the active level. The delay cycle number is changed from zero (0) to several cycles depending upon the synchronous operation of the laser printer machine system LZPMCN with the print data supply system.

As described above, the address operation processing by the print output address operation controller LZCTR is not an sequential execution synchronized with the clock signal CLK only. Rather, the address operation is synchronized with the state of the laser printer machine system LZPMCN indicated by the linechanging signal CR, the page-changing signal CP and the print address output request signal PRREQ. Therefore, print output address operation control is accomplished by a relatively small scale circuit utilizing the state signal of the laser printer machine system LZPCN. This small scale circuit control does not require any complex timing adjustment circuits for adjusting the address control to any change in the state of the laser printer machine system LZPMCN.

Figure 7:
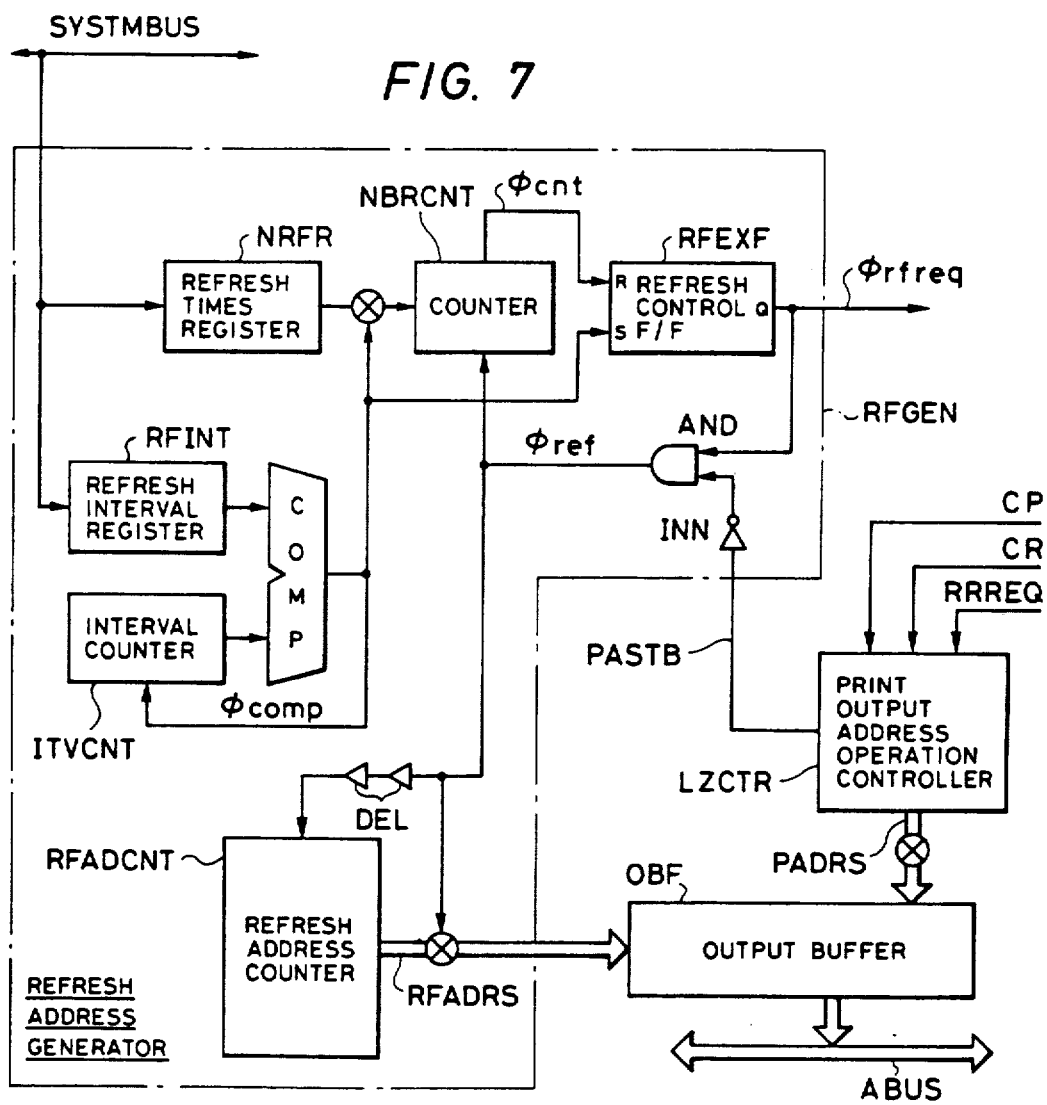
FIG. 7 is a block diagram showing in detail an example of the refresh address generator shown in FIG. 1.

FIG. 7 is a block diagram detailing one example of the refresh address generator RFGEN described above.

In FIG. 7, symbol RFINT represents a refresh interval register which contains the refresh interval necessary to maintain the data in the DRAM of the frame buffer memory FBM. The initial value of the RFINT is set by the host processor HMPU. Symbol ITVCNT represents an interval counter which is normally incremented once per memory cycle. The value of this interval counter ITVCNT is compared with the refresh interval register by a comparator COMP. The coincidence detection signal $\phi_{comp}$ outputted from the comparator COMP functions as a reset signal to the interval counter ITVCNT and also as signal for the preset transfer of refresh time data from the refresh times register NRFR to a times counter NBRCNT. Furthermore, the coincidence detection signal $\phi_{comp}$ is used to set an RS type flip-flop used for refresh control RFEXF. The refresh times data for one refresh interval is initially set in the refresh times register NRFR by the host processor HMPU. In accordance with this embodiment, the refresh times data is four times.

The times counter NBRCNT is a down-counter which counts down the refresh times data from "4" to "0" and a count-up signal $\phi_{cnt}$ representing the decrement operation to "0" is used as the reset signal of the refresh control flip-flop RFEXF described above. Therefore, during the period from the start of the refresh interval till the point of time at which the times counter NBRCNT is decremented to "0", the output signal $\phi_{rfrec}$ of the fresh control flip-flop RFEXF is set to the high level as the refresh request level.

The output signal $\phi_{rfreq}$ is inputted subjected to a logical AND product operation with the inverted signal of the print address output instruction signal PASTB outputted from the print output address operation controller LZCTR (the signal delayed by a predetermined period of time with respect to the print address output request signal PRREQ, though this is not particularly limitative), and the AND gate outputs a refresh control signal $\phi_{ref}$. This refresh control signal $\phi_{ref}$ is set to the high level when no output request is made for the print address by the print address output signal in a predetermined memory cycle. In other words, the output operation of the print address disables the output operation of the refresh address in each memory cycle of the frame buffer memory.

When the refresh control signal $\phi_{ref}$ is set to the high level, the refresh address counter RFADCNT outputs the predetermined refresh address RFADRS to the address bus ABUS through the output buffer OBF. The refresh address counter RFADCNT continues the address counting synchronized with the memory cycle to vary the predetermined refresh address until the refresh control signal $\phi_{ref}$ is changed to the low level. Furthermore, the refresh control signal $\phi_{ref}$ enables the count down operation of the times counter NBRCNT when $\phi_{ref}$ is at the high level. This count down operation is also synchronized with the memory cycles. The counting operation by the times counter NBRCNT is executed synchronously with the counting operation of the refresh address counter RFADCNT while the refresh control signal $\phi_{ref}$ remains at the high level. Symbol DEL in FIG. 7 represents a delay circuit Here, the operation cycle of the laser printer machine system LZPMCN is sometimes slower than the memory cycle of the frame buffer memory FBM and the print data to be read in one memory cycle can be read in a word or byte unit. Therefore, the output timing of the print output address PADRS is substantially at random with respect to the memory cycle of the frame buffer memory FBM as shown in FIG. 8.

Figure 8:
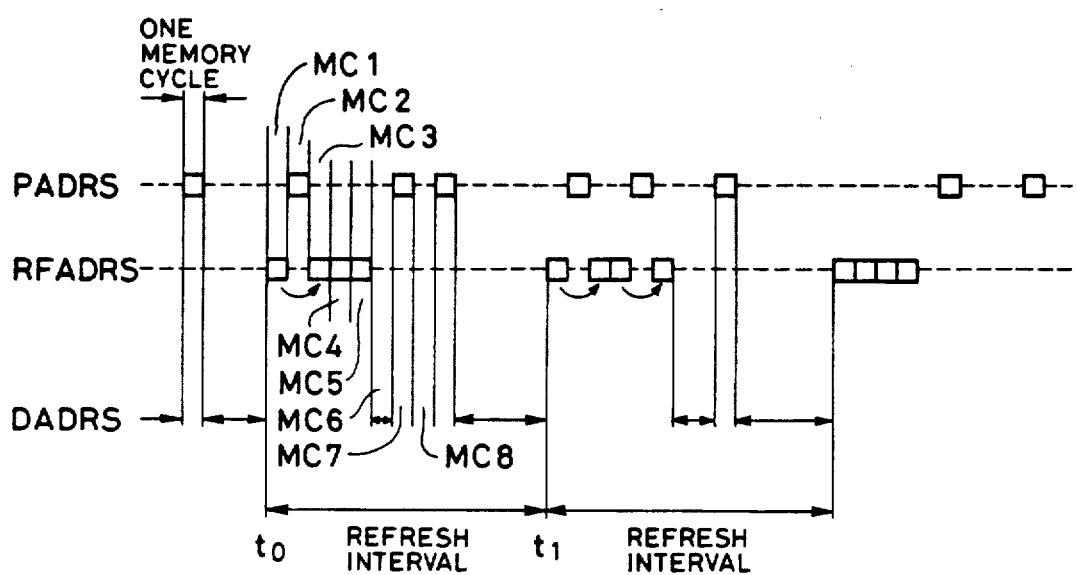
FIG. 8 is a timing chart showing the mutual output timing of a print address, a refresh address and a drawing address.

For instance, when the refresh interval starts from the time $t_0$ as shown in FIG. 8, the refresh control flip-flop RFEXF is set and its output signal $\phi_{rfreq}$ is set to the high level as the refresh request level. This output signal $\phi_{rfeq}$ is supplied to the drawing processor DRWPRO and when it is at the high level, representing a refresh request, the output operation of the drawing address DADRS by the drawing processor DRWPRO is inhibited. In the first memory cycle MC1 after the time $t_0$, no print address output request is raised so the refresh control signal $\phi_{ref}$, the logical product signal between the output signal $\phi_{rfreq}$ and the inverted print address output instruction signal PASTB, is set to the active level. Thus, the refresh address RFADR is supplied from the refresh address counter RFADCNT to the frame buffer memory FBM in this memory cycle MC1.

In the next memory cycle MC2, the inverted print address output instruction signal PASTB is set to the low level by the generation of the print address output request causing the refresh control signal $\phi_{ref}$ outputted from the AND gate to go to the low level. This inhibits the output operation of the refresh address RFADR by the refresh address counter RFADCNT during memory cycle MC2 and the print address PADRS is supplied to the frame buffer memory FBM from the print output address operation controller LZPCNT. At this time, the decrementing of the times counter NBRCNT and the updating operation of the refresh address by the refresh address counter RFADCNT are inhibited by the low level of the refresh control signal $\phi_{ref}$ in the refresh address generator RFGEN. The remaining three times of refresh address output operations in this refresh interval are then executed in subsequent memory cycles in which no print address output operation is requested. As depicted in FIG. 8, during the memory cycles MC3 to MC5 in which the print address output operation is not requested, the next refresh addresses RFADRS are sequentially supplied to the frame buffer memory FBM.

After the predetermined four refresh addresses RFADRS are outputted in this manner during one refresh interval, the count-up signal $\phi_{cnt}$ outputted from the times counter NBRCNT is set to the active level to reset the refresh control flip-flop RFEXF described above. Accordingly, the output signal $\phi_{rfreq}$ which functions as the refresh request signal returns to the low level until the time t1 at which the count value of the interval counter ITVCNT equals the refresh interval data in RFINT causing the signal $\phi_{comp}$ to set the refresh control flip-flop RFEXF.

When the output signal $\phi_{rfreq}$ is set to the low level in the period from the memory cycle MC6 to the time $t_1$, the drawing address output from the drawing processor DRWPRO is permitted in the memory cycle (e.g. MC6) if the output request of the print address is not generated. In a memory cycle (e.g. MC7) where the output request of the print address is generated, the output operation of the print address PADRS by the print output address operation controller LZCTR is executed.

Figure 9:
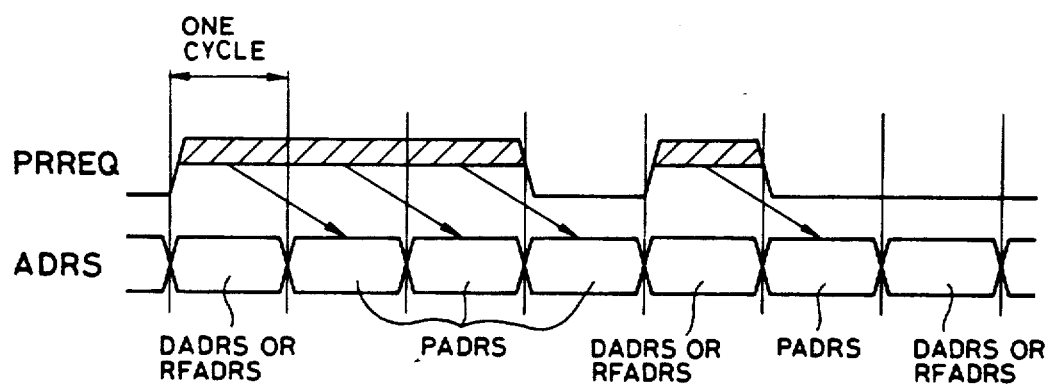
FIG. 9 is an explanatory view showing the output timing of a print address output request signal and various address data.

FIG. 9 shows the output timing of the print address output request signal PRREQ and various addresses. In the drawing, the output timing of each address is delayed by one memory cycle with respect to the change of the print address output request signal PRREQ to the active level. This delay cycle number can be changed from zero (0) to several cycles in relation to the synchronous operation of the laser printer machine system LZPMCN with the print data supply system.

In the manner described above, the refresh address generator RFGEN generates the refresh timing derived from the predetermined refresh interval in synchronization with the output request of the print address data. Thus, the refresh address output control can be coordinated with the print data output address operation control derived from the status of the laser printer machine system LZPMCN.

The embodiments described above provide the following action and effect.

(1) The address operation processing by the print output address operation controller LZCTR is not sequentially executed and synchronized to a predetermined timing signal. Rather, the operation is coordinated with the state of the laser printer machine system LZPMCN derived from the line-changing signal CR, the pagechanging signal CP and the print address output request signal PRREQ. Therefore, the print output address operation control can be accomplished by a simpler circuit configuration than a system requiring complex timing adjustment circuits to synchronize the state change of the laser printer machine system IZPMCN with the print output address operation.

(2) The simple circuit construction can supply the necessary print data to the laser printer machine system LZPMCN and can compensate for timing changes due to page changes occurring from events such as paper or ink shortage. Compared with a display controller used for laser printer control, the present invention can eliminate additional timing adjustment circuits thus simplifying the control system therefor (3) The refresh address generator RFGEN coordinates the memory refresh operation during a predetermined refresh interval with the output request of the print address. This coordination is accomplished with signals derived from the state of the laser printer machine system LZPMCN.

(4) The refresh address generator RFGEN provides the refresh request to the drawing processor DRWPRO during the refresh request period which inhibits the output of the drawing address. When the print address output request is made during the refresh request period, the refresh address generator RFGEN inhibits the output of the refresh address. This results in a prioritized output address scheme in the laser print controller LZPCTR where the print address PADRS is higher than the refresh address RFADRS which is higher than the drawing address DADRS.

(5) The actions and effects described above enable the laser printer print controller LZPCTR to efficiently and reliably coordinate the output timing of the print address, the drawing address and the refresh address with the state of the laser printer machine system LZPMCN.

Although the present invention has thus been described definitely with some preferred forms thereof, it is not particularly limited thereto but can be changed or modified in various manners without departing from the spirit and scope thereof.

For instance, the laser printer print controller LZPCTR in each of the embodiments described above executes the drawing function for the frame buffer memory by its built-in drawing processor DRWPRO, but the present invention is not particularly limited to such an arrangement. For instance, the drawing function may be supported by a drawing processor or by a host processor having a different functional block from the laser printer print controller LZPCTR. Though the line-changing signal CR, the page-changing signal CP and the print address output request signal PRREQ are used as the signals for determining the state of the laser printer machine system LZPMCN by the laser printer print controller in the foregoing embodiments, various other modified signals may be used so long as they reflect the state of the laser printer machine system LZPMCN. Furthermore, the definition of the signals from the machine system may be changed to reflect the construction of a machine driving system of a hardcopy apparatus such as the laser printer machine system.

Although the description given above deals with the laser printer print controller as the background and field of utilization of the present invention, the invention is not particularly limited thereto. The present invention can be applied widely to image data processing in a laser printer which uses a print head formed by semiconductor laser devices in matrix without a rotary polyhedral mirror, a nonimpact type printer using a matrix of liquid crystal shutters or an impact printer which uses a dot matrix print head. The present invention can also be applied to any apparatus which processes image formation data for a hard copy apparatus by accessing a frame buffer memory for storing the image data in a bit map system. In such a case, the image formation data stored in the frame buffer memory are not particularly limited to those which can be converted directly to video signals, but may be those which can be converted to video signals of patterns such as characters from a character generator.

What is claimed is:

1. An image data control system comprising:
a microprocessor;
memory means for storing image formation data;
printer means for forming an image on paper in accordance with the image formation data;
access control means, coupled to the microprocessor, and for making access control to the memory means in response to a command from the microcomputer, wherein the access control means is formed on a single semiconductor chip;
state designation signal generating means coupled to the printer means for generating at least two state designation signals representing the operation state of the printer means;
the access control means having an address operation function, the operation function being controlled in accordance with the state designation signals;
a first of the at least two state designation signals being a print address output request signal, wherein the access control means executes the address operation function for sequentially generating correspondign address signals in accordance with the output request signal; and
a second of the at least two states designation signals being at least one of a page-changing signal representing a change in a page of the paper to be printed upon by the print means, wherein the access control means executes the address operation function for generating a correspondence address signal in accordance with the page-changing signal and a line-changing signal representing a change of a line to be printed by the print means, wherein the access control means executes the address operation function for generating a corresponding address signal in accordance with the line-changing signals.

2. The image data control system according to claim 1, wherein the access control means has a drawing address formation function for generating a drawing address signal used for rewriting at least part of the data stored in the memory means.

3. The image data control system according to claim 2, wherein the memory means includes a dynamic random access memory, and the access control means has a refresh address generation function for generating a refresh address signal for the dynamic random access memory.

4. The image data control system according to claim 3, wherein the access control means sends selectively any of the address signal, the drawing address signal and the refresh address signal generated in accordance with the address operation function.

5. The image data control system according to claim 4, wherein the address signal generated in accordance with the address operation function is delivered more preferentially to the refresh address signal, and a preferred refresh address signal is delivered instead of the drawing address signal.

* * * * *